US006379293B1

(12) United States Patent
Kim et al.

(10) Patent No.: US 6,379,293 B1
(45) Date of Patent: Apr. 30, 2002

(54) CENTRIFUGAL EXTRACTOR FOR ORGANIC PHASE USING A HEIGHT-ADJUSTABLE WEIR AND A DIVERT DISK

(75) Inventors: Young-Hwan Kim; Ji-Sup Yoon; Jae-Hoo Jung; Seong-Won Park; Hyun-Soo Park, all of Daejeon-Si (KR)

(73) Assignees: Korea Atomic Energy Research Institute, Daejeon-Si; Korea Electric Power Corporation, Seoul, both of (KR)

( * ) Notice: Subject to any disclaimer, the term of this patent is extended or adjusted under 35 U.S.C. 154(b) by 0 days.

(21) Appl. No.: 09/593,415

(22) Filed: Jun. 14, 2000

(30) Foreign Application Priority Data

Mar. 9, 2000 (KR) ........................................ 2000-11772

(51) Int. Cl.$^7$ ................................................ B04B 1/00

(52) U.S. Cl. ........................................ 494/56; 494/60

(58) Field of Search .......................... 210/360.1, 380.1, 210/512.3; 494/43, 56, 60

(56) References Cited

U.S. PATENT DOCUMENTS 4,857,040 A * 8/1989 Kashihara et al. ............ 494/56

* cited by examiner

Primary Examiner—David A. Reifsnyder
(74) Attorney, Agent, or Firm—Arent Fox Kintner Plotkin & Kahn, PLLC

(57) ABSTRACT

A centrifugal extractor for extraction of an organic phase from a liquid mixture, such as liquid radioactive wastes, is disclosed. In the centrifugal extractor, both the separating weir and the divert disk are designed to be adjustable in their vertical positions. The extractor, thus, desirably separates the organic phase, including usable elements in addition to chemically toxic high radioactive elements, from the aqueous phase and desirably controls the reaction time of the two phases regardless of a variation of the mixing ratio and the rotational speed of the two phases. In the centrifugal extractor, a liquid suction and rotation unit sucks and rotates the liquid mixture and separates the organic phase from the aqueous phase while controlling the reaction time of the two phases. A height-adjustable separation weir unit is designed to locate the separating weir at a boundary layer between the two separated phases. A housing unit supports the suction and rotation unit and provides the path of two separated phases to the outside of the extractor.

9 Claims, 5 Drawing Sheets

Schemetics of centrifugal extractor

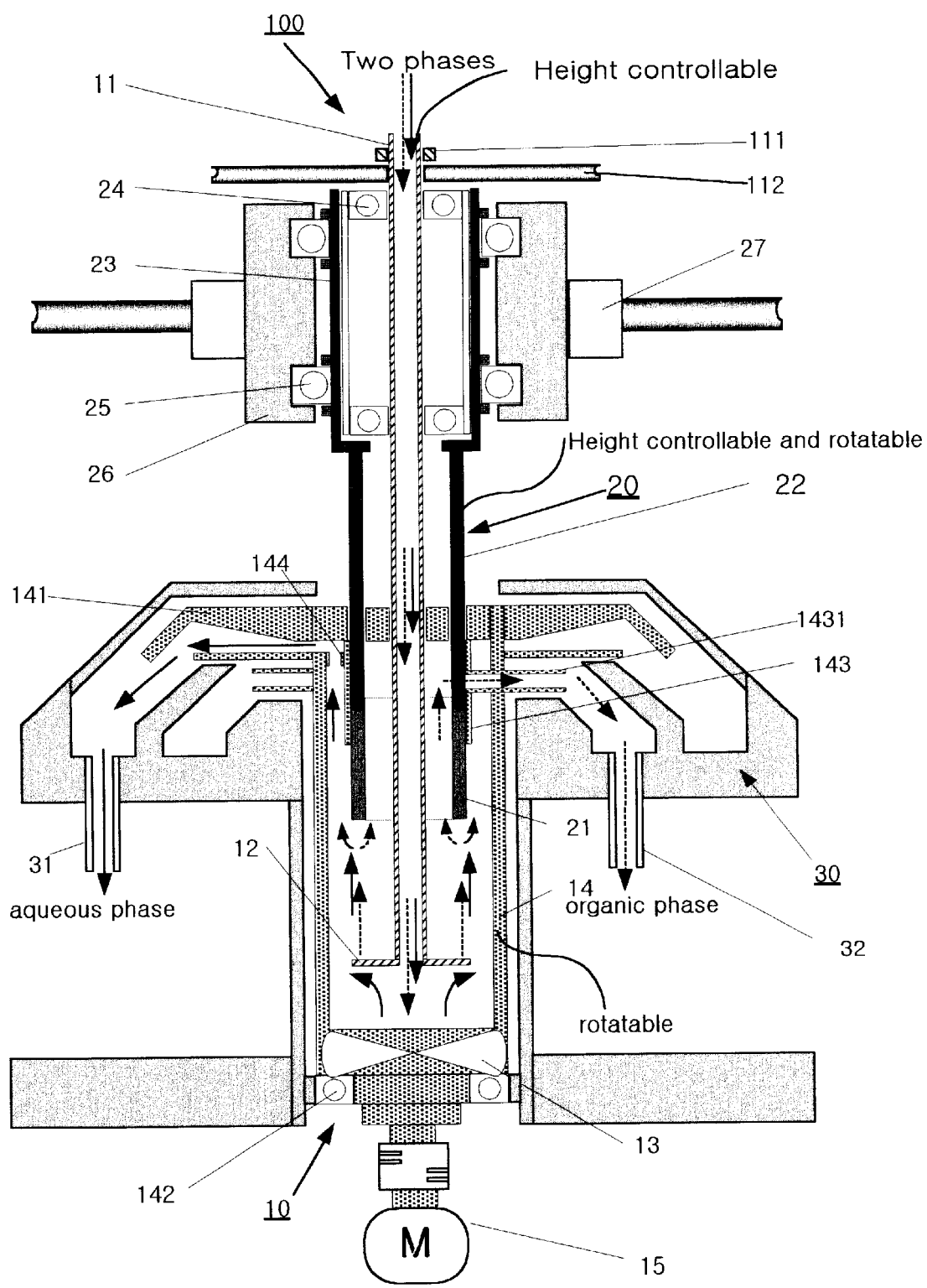
Fig 1. Schemetics of centrifugal extractor

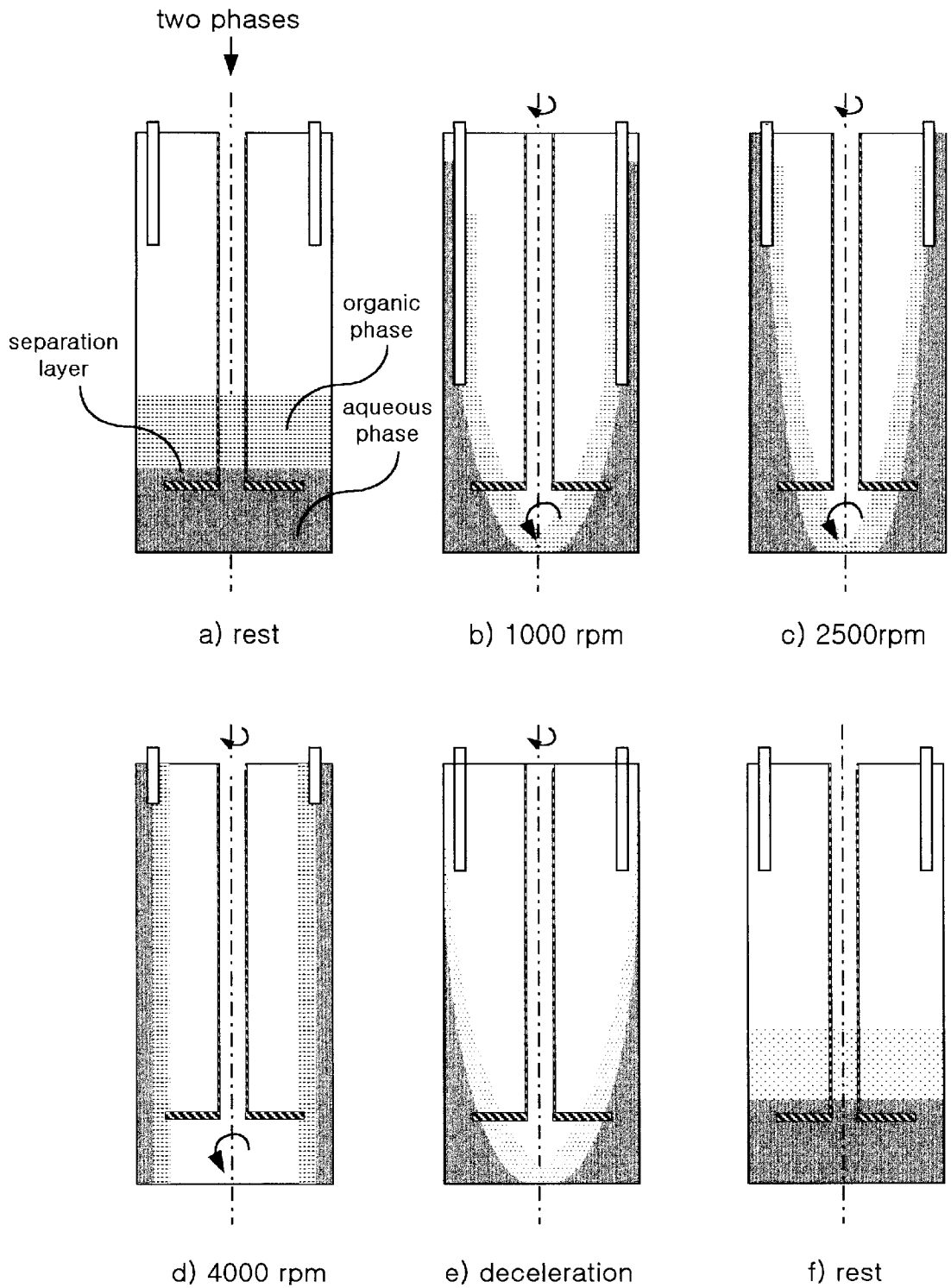
Fig 2. Height adjustment of separation weir in accordance with rotational speed and separation layer

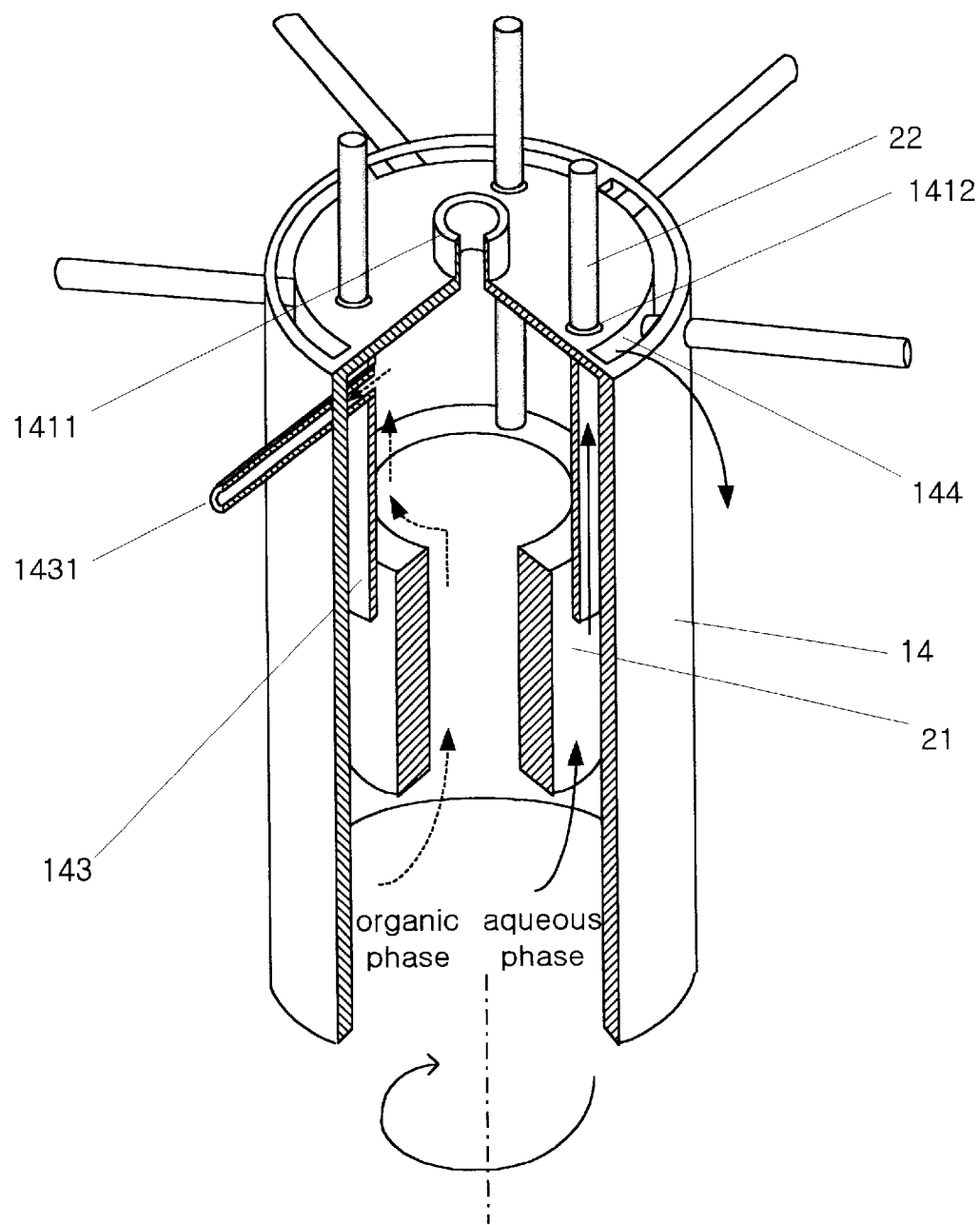
Fig 3. Perspective drawing of interior structure of centrifugal extractor

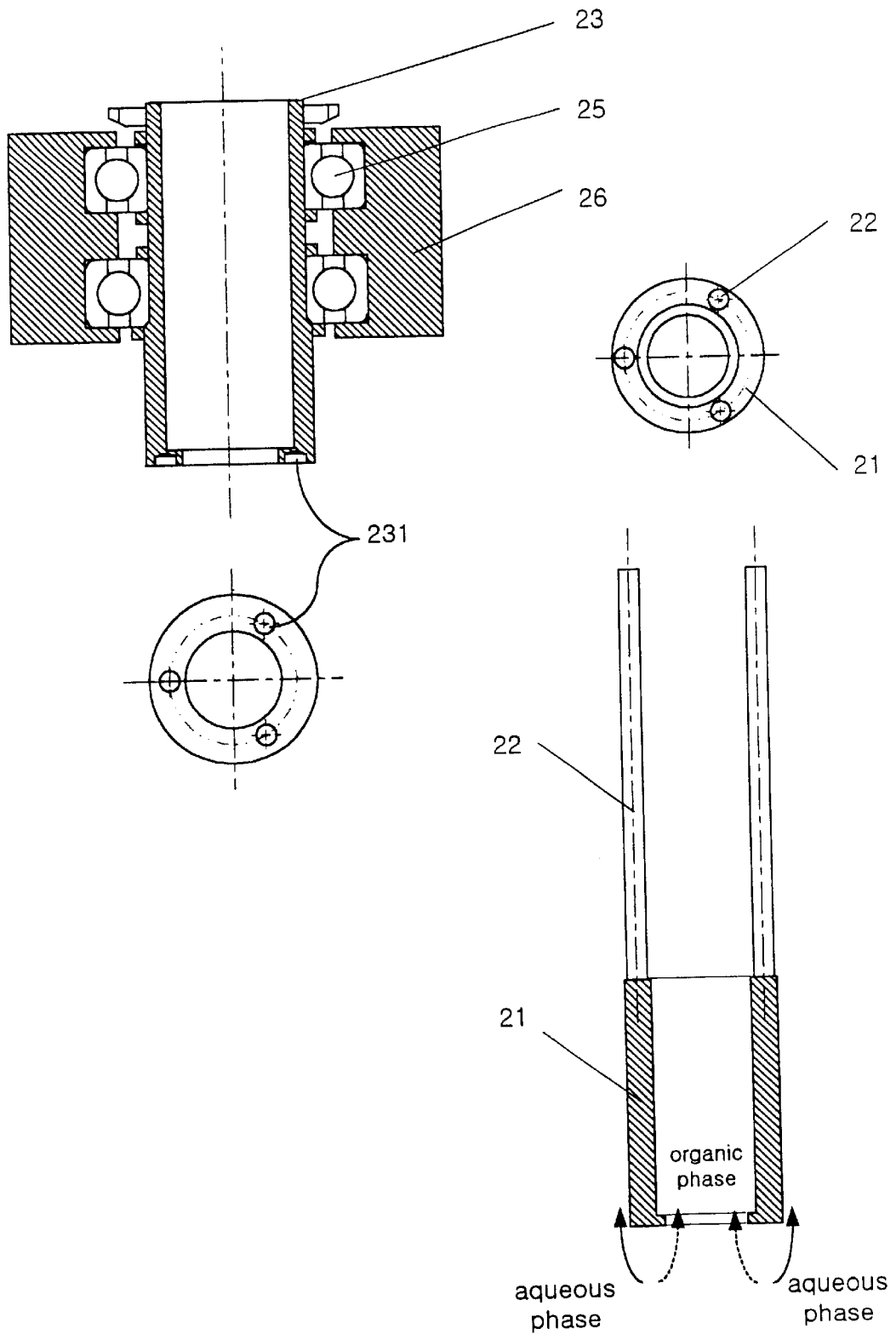
Fig 4. Height adjustable separation weir

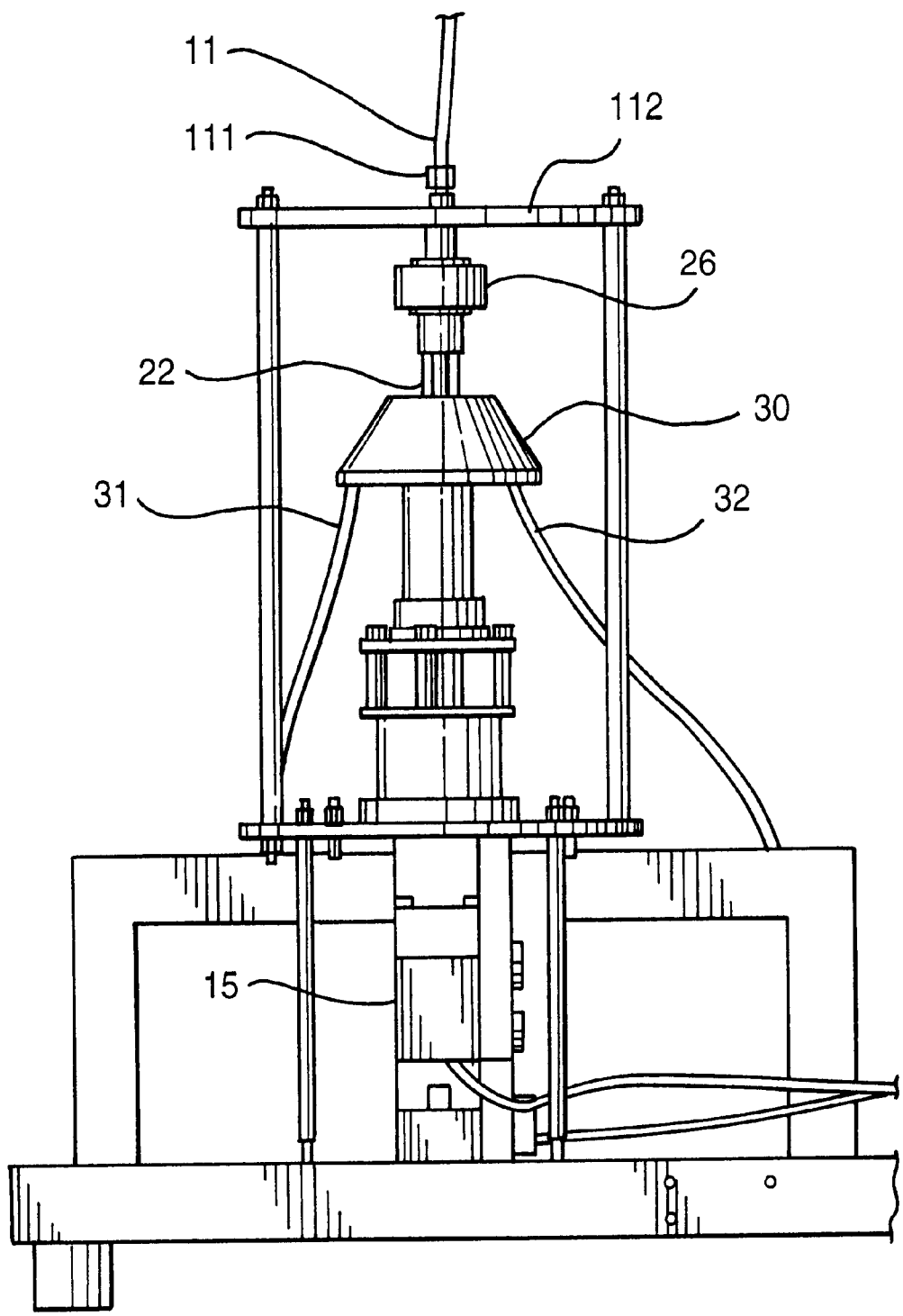
Fig 5. Photography of centrifugal extractor

CENTRIFUGAL EXTRACTOR FOR ORGANIC PHASE USING A HEIGHT-ADJUSTABLE WEIR AND A DIVERT DISK

BACKGROUND OF THE INVENTION

1. Field of the Invention

The present invention relates, in general, to centrifugal extractors for extraction of an organic phase, including valuable elements such as platinoid elements, or the high radioactive elements, from the liquid radioactive wastes, thus preferably reducing the quantity of the radioactive wastes. More particularly, this invention relates to a structural improvement in such extractors to allow both a phase separation weir and a divert disk to be adjustable in their positions, thus effectively separating the organic phase from the liquid radioactive wastes.

2. Description of the Prior Art

A centrifugal extractor is widely used for the separation of an organic phase from an aqueous phase. In the conventional centrifugal extractor, both the height and thickness of a boundary layer between two phases vary in accordance with a mixing ratio of the two phases, as well as rotational speed of the mixed liquid as shown in FIGS. 2a to 2f. In addition, the reaction time of the two phases varies in accordance with the rotational speed of the centrifugal extractor. Therefore, to improve a saturation efficiency of such centrifugal extractors, it is necessary to adjust a height of a phase separating weir in accordance with a thickness of the boundary layer between two phases which varies with the mixing ratio. It is also necessary to appropriately control both the rotational speed and the reaction time of two phases.

However, in a conventional centrifugal extractor, the phase separating weir has a fixed height, so the extractor fails to deal a variation of the mixing ratio of the two phases. In this reason the satisfactory separation efficiency can not be obtained with the conventional extractor. So in the prior art, it is necessary to use a number of centrifugal extractors, having different rotational speeds in addition to separating weirs in different heights, to countermeasure the various mixing ratios of the phases. In addition, since it is impossible to adjust the height of the phase separating weir of the conventional extractor as desired, the liquid mixture has to be continuously rotated at a high speed until two phases are completely and parallely separated from each other as shown in FIG. 2d. In this case, the rotational speed of the centrifugal extractor should be set to a high velocity so that the reaction time of the two phases in the extractor is undesirably reduced. In addition, it is impossible to control the reaction time of the two phases as desired.

SUMMARY OF THE INVENTION

Accordingly, the present invention considers above problems in the prior art, and an object of the present invention is to provide a centrifugal extractor for effectively separating an organic phase from an aqueous phase of a liquid mixture, such as liquid radioactive wastes, which has an arbitrary mixing ratio of two phases by introducing height adjustable weir and divert disk. Thus, the extractor effectively recovers usable elements from the radioactive wastes while preferably reducing the quantity of radioactive wastes and finally conserving the storage capacity of radioactive waste.

In order to accomplish the above object, the present invention provides a centrifugal extractor, Being comprised: a liquid suction and rotation unit used for sucking the liquid mixture into the extractor, and separating the organic phase from the aqueous phase by rotating the mixture while adjusting the reaction time of the two phases; a height-adjustable separating weir unit used for locating the separating weir at a boundary layer between the two separated phases; and a housing unit used for supporting the liquid suction and rotation unit and providing the discharging paths of the two separated phases to the outside of the extractor, whereby the centrifugal extractor desirably separates the organic phase from the aqueous phase of the liquid mixture and desirably controls the reaction time of the two phases within the separator regardless of a variation of the mixing ratio of the two phases and/or a variation of the rotational speed of the separator.

The centrifugal extractor of this invention uses both a height-adjustable separating weir and a divert disk. The separating weir is installed between internal and external bearings. It is adjustable in its height in accordance with a thickness of the boundary layer formed between the organic and aqueous phases which varies with the mixing ratio of the two phases as well as the rotational speed of the mixtures. The centrifugal extractor of this invention is thus improved in its separation efficiency and allows a user to appropriately control the reaction time of the two phases. A divert disk, on which the two mixed phases collide to, is used for increasing the liquid flow speed in the centrifugal direction. This disk is mounted to an inlet tube and its height can be adjusted. Thus, it allows the user to appropriately select the reaction time of the mixed phases, by changing the liquid volumes contained between the divert disk and an impeller.

BRIEF DESCRIPTION OF THE DRAWINGS

The above and other objects, features and other advantages of the present invention will be more clearly understood from the following detailed description taken in conjunction with the attached drawings, in which:

FIG. 1 is a sectional view, showing the constitution and operation of a centrifugal extractor in accordance with the preferred embodiment of the present invention;

FIGS. 2a to 2f are views, showing a height adjustment of a phase separating weir included in the above centrifugal extractor, in accordance with both a variable rotational speed of the extractor and a thickness of the boundary layer between organic and aqueous phases;

FIG. 3 is a partially sectioned perspective view, showing the interior structure of the centrifugal extractor of this invention;

FIG. 4 is a view, showing the construction of the height-adjustable separating weir of this invention; and FIG. 5 is a photograph of the centrifugal extractor of this invention.

DESCRIPTION OF THE PREFERRED EMBODIMENTS

As shown in FIG. 1, the centrifugal extractor (100) of this invention is composed of a liquid suction and rotation unit (10), a height-adjustable separating weir unit (20), and a housing unit (30). The liquid suction and rotation unit (10) sucks and rotates the liquid mixtures and thereby separates an organic phase from an aqueous phase. The height-adjustable separating weir unit (20) locates the phase separating weir (21) at a boundary layer between the two separated phases and thereby separating the organic phase from the aqueous phase. The housing unit (30) supports the suction and rotation unit (10) and provides the discharging paths of two separated phases to the outside of the extractor.

The suction and rotation unit (10) consists of an inlet tube (11), a divert disk (12) attached to the end of the inlet tube (11), an impeller (13) installed at a position under the divert disk (12), a rotor (14) integrated with the impeller (13), and a rotor motor (15).

The inlet tube (11) is used for sucking the liquid mixture into the centrifugal extractor (100). The inlet tube (11) is firmly assembled with a tube clamping frame (112) by a tube clamping bolt (111).

The divert disk (12), used for allowing the two phases to collide thereon to increase the liquid flow speed in a centrifugal direction, is mounted to the lower end of the inlet tube (11). By vertically moving the inlet tube (11), the divert disk (12) is moved into the same direction, and it is possible to control the time interval that the two phases reside within the extractor (100) as desired. That is, by adjusting the height of the divert disk (12), the liquid volume between the suction impeller (13) and the divert disk (12) can be changed, so that this time interval is preferably controlled.

The height of the divert disk (12) can be adjusted by loosening the tube clamping bolt (111) mounted on the tube clamping frame (112). Once the bolt is loosened the inlet tube (11) can be freely moved. After vertically moving the divert disk (12) to the desired position, the tube clamping bolt (111) is tightened so as to lock the adjusted height of the disk (12).

The impeller (13), used for sucking the liquid mixture into the inlet tube (11), is installed at under the divert disk (12) and is operated along with the rotor (14) by driving force of the rotor motor (14).

The rotor (14) is used for giving a centrifugal force to the liquid mixture, inhaled by the impeller (14), thus separating the organic phase from the aqueous phase prior to separately discharging the two phases. The rotor (14) has a hollow cylindrical shape and is provided with a splash plate (141) at its upper end for guiding a separated aqueous phase to a fixed exit (31). The rotor (14) is firmly supported within the housing unit (30) by a support bearing (142).

As best seen in FIG. 3, a guide cylinder (143) is concentrically positioned within the rotor (14) at an upper end portion. A rotational exit of aqueous phase (144) is formed at the annular gap between the rotor (14) and the guide cylinder (143). This exit (144) provides the discharging path of the separated aqueous phase from the interior of the rotor (14) to the fixed exit of aqueous phase (31) as can be seen in FIG. 1. On the other hand, several rotational exits of organic phase (1431) are made at the upper end portion of the sidewall of the guide cylinder (143) and extend outward in a radial direction while passing through the rotor (14). These exits (1431) provide the discharging path of the separated organic phase from the interior of the weir guide (143).

The splash plate (141) is used for guiding the separated aqueous phase from the rotational exit of aqueous phase (144) into the housing unit (30) and has an inlet tube guide (1411) at its center where the inlet tube (11) vertically passes through. Guide rod bushes (1412), used for guiding the guide rods (22), are made on the top surface of the splash plate (141).

As shown in FIGS. 1 and 4, the height-adjustable separating weir unit (20) is designed to control the height of the separating weir (21) as desired. The weir unit (20) comprises the phase separating weir (21) which divides the paths of aqueous and organic phases after being separated from each other with a boundary layer. The weir unit (20) also comprises three height adjusting guide rods (22), an internal bearing clamping cap (23), an internal bearing (24), an external bearing (25), an external bearing clamping cap (26) and a clamping bolt (27). The guide rods (22) extend upwardly from the top end of the separating weir (21), while the internal bearing clamping cap (23) is integrally seated on the top ends of the guide rods (22).

In the weir unit (20), both the guide rods (22) and the inlet tube (11) are set within the extractor (100). And the guide rods (22) extend through guide rod bushes (1412) of the splash plate (141) and the inlet tube (11) extends through the inlet tube guide (1411) of the splash plate (141). Also, the external bearing clamping cap (26) is fixed to the extractor housing by a locking bolt (27), and the inlet tube (11) is fixed to the extractor housing by a tube clamping bolt (111). Therefore, by driving the rotor motor (15), the parts of the weir unit (20) except for the external bearing clamping cap (26) are rotated along with the parts of the liquid suction and rotation unit (10) except for both the inlet tube (11) and the divert disk (12).

Three guide rods (22), connected to the bottom of the internal bearing clamping cap (23), are vertically movable under being guided by three guide rod bushes (1412). And by moving the guide rods (22), the phase separating weir (21) can be vertically moved under the guide of the guide cylinder (143). It is thus possible to adjust the height of the phase separating weir (21) as desired by moving the guide rods (22) in the vertical direction as shown in FIG. 3. After adjusting the position of the separation weir (21), the external bearing clamping cap (26) is tightened by the clamping bolt (27).

All the above-mentioned rotating parts are supported by the external bearing (25) and the support bearing (142) and are rotated by the rotor motor (15).

The housing unit (30) supports the liquid suction and rotation unit (10), and provides the discharging paths of two separated phases to the outside of the extractor (100).

The centrifugal extractor (100) of this invention is operated as follows.

As shown in FIG. 1, a liquid mixture or the liquid radioactive wastes is sucked into the rotor (14) by the impeller (13), which is rotated along with the rotor (14) by the rotor motor (15).

The liquid mixture, sucked into the rotor (14), collides on the divert disk (12) mounted to the lower end of the inlet tube (11), thus being accelerated in a radial direction by a centrifugal force. The centrifugal forces acting on the each phases of the liquid mixture are different from each other due to a difference in the specific weight of the two phases. Therefore, the aqueous phase, having a relatively higher specific weight, is concentrated to the inner surface of the rotor (14), while the organic phase, having a relatively lower specific weight, is concentrated to a position inside of the aqueous phase as shown in FIGS. 2b and 2c.

As the rotational speed of the rotor (14) is increased, the centrifugal force is also increased. And thus, two phases move upward along the interior surface of the rotor (14). The thickness variation of the boundary layer between the two phases with various rotational rotor speeds is shown in FIGS. 2b to 2e. If the vertical position of the separating weir (21) is appropriately adjusted while observing the position of the boundary layer, so as to allow the inlet of the weir (21) to be always positioned at the boundary layer, the organic phase is effectively and almost completely separated from the aqueous phase by the phase separating weir (21).

The separated organic phase moves upward along the inner surface of the weir (21), and passes through the six rotational exits of organic phase (1431). And then, it is discharged to the outside of the extractor (100) through the fixed exit of organic phase (32). On the other hand, the separated aqueous phase moves upward along the annular gap between the inner surface of the rotor (14) and the outer surface of the guide cylinder (143) and is discharged from the rotor (14) through the rotational exit of aqueous phase (144). Thereafter, the aqueous phase flows under the guide of the splash plate (141) and is discharged to the outside of the extractor (100) through the fixed exit of aqueous phase (31).

In order to investigate the performance of the centrifugal extractor of this invention, a centrifugal extractor shown in FIG. 5 was manufactured and a series of experiments has been performed. In the experiment, a scale was attached to the tube clamping frame (112) to measure the adjusted positions of both the separating weir (21) and the divert disk (12). The experiments were performed at room temperature, with kerosene being used as the organic phase and distilled water laden with brown rusty iron powder as the aqueous phase solvent. The purpose of using the rusty iron powder is to easily distinguish the aqueous phase from the organic phase since the rusty iron powder is not dissolved in the organic phase, but is dissolved in the aqueous phase.

Experiment 1. Measurement of the residence time of two phases in the extractor with various heights of the divert plate (12)

The variation of residence time of the two phases in the extractor was measured while changing the height of the divert disk (12), with the rotational speed of the rotor (14) being fixed at 3,000 rpm. The height of the divert disk (12) was determined by measuring the gap between the divert disk (12) and the suction impeller (13). The residence time might be measured by counting the time interval between a time the two phases were fed into the extractor and a time the separated phases were completely discharged from the extractor. However, it was almost impossible to precisely check this time interval using a stopwatch. So, this interval was determined by measuring the electric conductance of fluids and converting it into the residence time. This method is frequently used in the chemical process of measuring the precise residence time of the two separated phases. Experimental result was obtained as shown in Table 1.

TABLE 1

Variation of the residence time with various height of the divert plate (12)

| Height of the divert plate (12) (mm) | Average residence time (sec) |
|---|---|
| 10 | 3.9 |
| 20 | 5.7 |
| 30 | 7.7 |
| 40 | 9.6 |

This experimental result shows that it is possible to effectively control the residence time of the two phases in the centrifugal extractor as desired by adjusting the height of the divert disk (12) of this invention.

Example 2. Verification of the relationship between the height of the separation weir (21) and the rotational speed of the rotor (14)

The rotational speed of the rotor (14) was measured at a time instant when the two phases were completely separated from each other while changing the height of the separation weir (21). The height of the separating weir (21) was determined by measuring the distance between the top surface of the splash plate (141) and the reference points marked at the guide rods (22). The time instant of complete separation of the two phases was precisely determined by using the same method of measuring the electronic conductance of the fluids as used in the experiment 1.

While performing the experiment, it was possible to observe the thickness of the boundary layer between the two phases is changed as the rotational speed of the rotor (14) is changed. Experimental result was obtained as shown in Table 2.

TABLE 2

Variation of the rotational speed of rotor (14) with various heights of the separation weir (21)

| Height of the separation weir (mm) | Rotational speed at the complete phase separation (rpm) |
|---|---|
| 10 | 2,400–2,500 |
| 20 | 3,700–3,800 |
| 30 | 4,500–4,700 |
| 40 | 5,600–5,700 |

This experimental result shows that it is possible to effectively and completely separate the two phases from each other regardless of a rotational speed of the rotor (14) by appropriately controlling the height of the separating weir (21) by using the centrifugal extractor of this invention.

As described above, the present invention provides a centrifugal extractor for separation of an organic phase from an aqueous phase of a liquid mixture, such as liquid radioactive wastes. The phases separating weir (21) and the divert disk (12) are designed to be adjustable in their positions and so it is possible to effectively and completely separate the organic phase from the aqueous phase even in the case of a low rotational speed of the liquid mixture. In addition, the volume of the internal spaces of the extractor is easily controlled by adjusting the height of the divert disk (12), and so it is possible to appropriately select the residence time, or the reaction time, of the two phases in the extractor.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A centrifugal extractor for extraction of an organic phase from an aqueous phase of a liquid mixture, comprising:
  a liquid suction and rotation unit used for sucking and rotating the liquid mixture, wherein the organic phase is separated from the aqueous phase while controlling a reaction time of the two phases in the extractor;
  a height-adjustable separation weir unit that locates a separating weir at a boundary layer between the two separated phases, wherein the organic phase is separated from the aqueous phase, wherein a position of the height-adjustable separation weir unit is adjustable in a vertical direction coaxially relative to a longitudinal axis of the extractor; and
  a housing unit that supports said suction and rotation unit and provides discharging paths of the two separated phases to an outside of said extractor,
  wherein the centrifugal extractor desirably separates the organic phase from the liquid mixture and desirably controls the reaction time of the two phases regardless of a variation of a mixing ration and/or a rotational speed of the two phases.

2. The centrifugal extractor according to claim 1, wherein said liquid suction and rotation unit comprises:

an inlet tube vertically set within the extractor and used for sucking the liquid mixture into the extractor;

a divert disk attached to a lower end of said inlet tube and used for increasing the liquid flow speed in a centrifugal direction;

an impeller installed at a position under said divert disk and used for sucking the liquid mixture into the extractor;

a rotor integrated with said impeller, thus being rotatable along with said impeller; and a rotor motor used for rotating said impeller.

3. The centrifugal extractor according to claim 2, wherein said inlet tube and said divert disk are integrated with each other into a single structure, and are movable in a vertical direction at the same time so as to be adjustable in their vertical positions within the extractor.

4. The centrifugal extractor according to claim 2, further comprising:

a splash plate formed at an upper end of said rotor that guides the separated aqueous phase to a fixed exit of the aqueous phase;

a weir guide cylinder concentrically positioned under said splash plate, with a rotational exit of the aqueous phase made at a top surface of said splash plate and used to discharge the separated aqueous phase from an interior of the rotor into said fixed exit of the aqueous phase; and several rotational exits of organic phase used for providing the discharging path of the separated organic phase from said separating weir to the fixed exit of the organic phase, and regularly formed along the upper end portion of a wall of said guide cylinder, and extending outward in a radial direction while passing through said rotor.

5. The centrifugal extractor according to claim 2, wherein said rotor and said impeller are rotated at the same time by said rotor motor.

6. The centrifugal extractor according to claims 2 or 4, wherein said rotor is supported by an external bearing and a support bearing.

7. The centrifugal extractor according to claim 1, wherein said height-adjustable separating weir unit comprises:

said separating weir that divides the discharging paths of the organic and the aqueous phases after being separated from each other;

three guide rods extending upwardly from a top end of said separating weir, and passing through guide rod bushes of a splash plate;

an internal bearing clamping cap integrally seated on top ends of said guide rods;

an internal bearing supporting an inlet tube;

an external bearing fixed to an extractor housing by a locking bolt;

an external bearing supporting said separating weir; and a clamping bolt that locks said external bearing clamping cap to said housing unit.

8. The centrifugal extractor according to claim 7, wherein said internal bearing clamping cap is rotated along with said guide rods, and said separating weir, and said splash plate at the same time by said rotor motor.

9. The centrifugal extractor according to claim 1, wherein said housing unit comprises:

a fixed exit discharging the separated aqueous phase to the outside of the said extractor; and a fixed exit of organic phase discharging the separated organic phase to the outside of said extractor.

* * * * *